Oct. 25, 1938.　　　　I. A. BENNETT　　　　2,134,393
FLOOR DUCT
Filed June 24, 1936　　　2 Sheets-Sheet 1
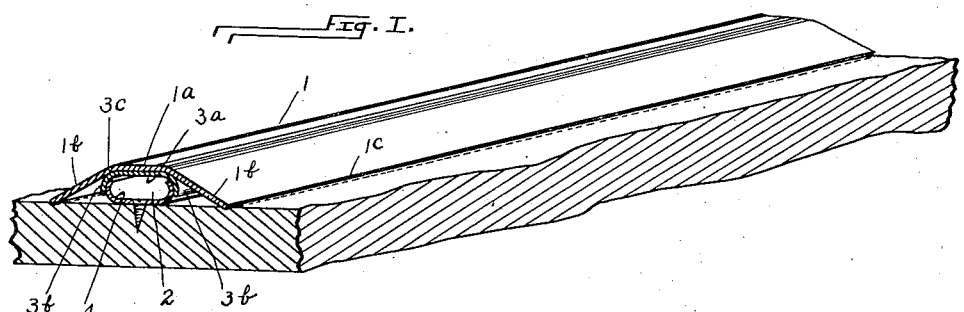
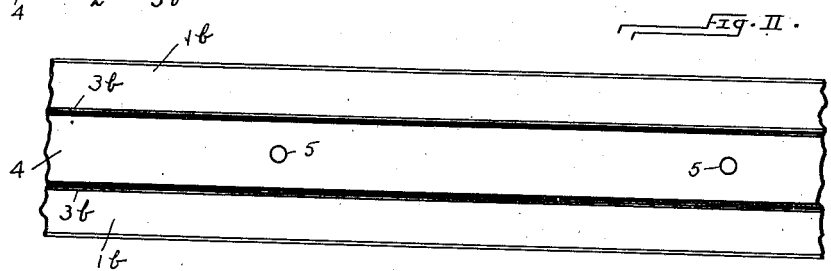
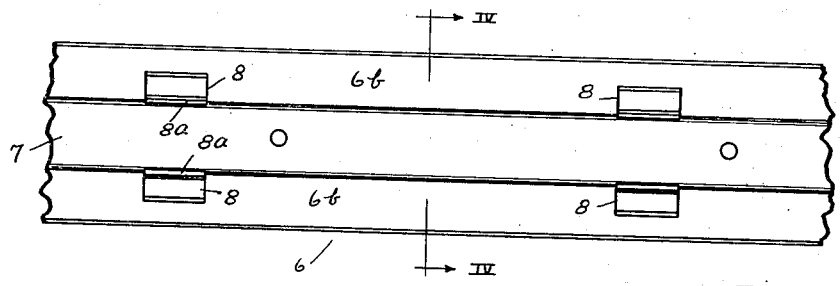
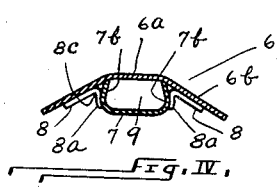
INVENTOR
Inslee A. Bennett
BY Christy and Wharton
ATTORNEYS Oct. 25, 1938.   I. A. BENNETT   2,134,393
FLOOR DUCT
Filed June 24, 1936   2 Sheets-Sheet 2
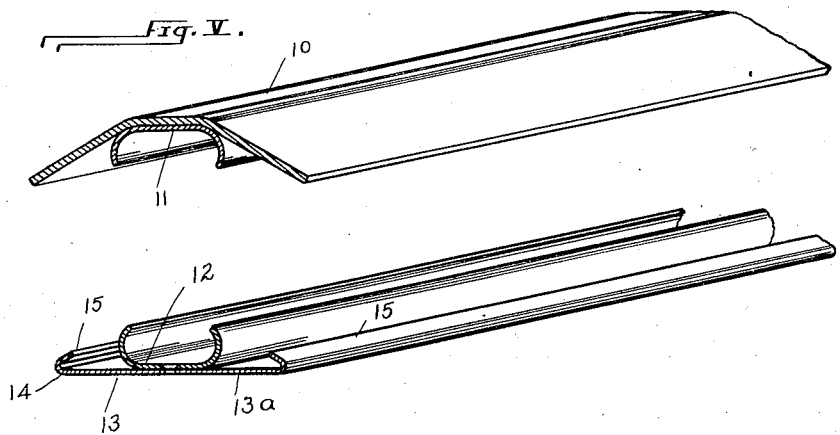
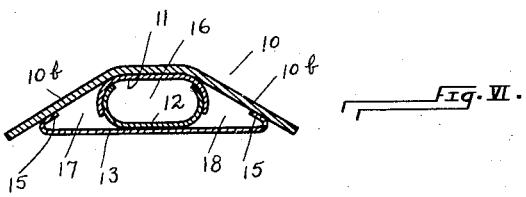
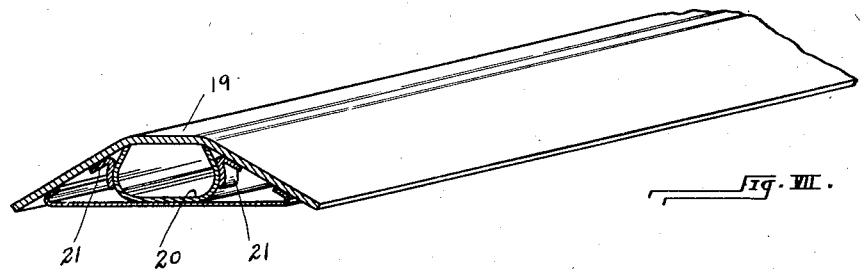
INVENTOR
Inslee A. Bennett
BY Christy and Wharton
ATTORNEYS Patented Oct. 25, 1938

2,134,393

UNITED STATES PATENT OFFICE 2,134,393

FLOOR DUCT

Inslee A. Bennett, Sharpsburg, Pa., assignor to National Electric Products Corporation, a corporation of Delaware Application June 24, 1936, Serial No. 87,030

4 Claims. (Cl. 247—37)

This invention relates to a floor duct for the housing of electrical wiring at the surface of a building floor.

Various requirements must be met by a duct which in installation is placed upon the surface of a floor to provide housing for electrical wiring. Thus the duct must possess sufficient strength and rigidity to resist deformation; it must be of a form to project a minimized height from the actual floor surface, and be of such form that it does not present to human feet, nor to objects on the floor, walls forming an abrupt angle with the plane of the floor; and, in order that it may closely engage the floor, it must be of such structure that it does not have any substantial surface contact with the floor surface. Further, the interior structure of the duct should be such that the duct elements have with each other a close surface-to-surface contact, without, by this interengagement, unduly increasing the over-all height of the duct.

I have provided a floor duct fulfilling these requirements, and have additionally provided a floor duct which satisfactorily may house the conductors of a plurality of circuits, which circuits, if desired, may be of different potential. In a floor duct designed to house a plurality of circuits, such, for example, as a lighting circuit, a telephone circuit, and a buzzer circuit, it is of importance that the several circuits be physically separated from each other. In making a floor duct adapted to house such plurality of circuits, it is necessary, in order that the duct be satisfactory in use, that it conform to the requirements above given for the form and structure of floor duct in general. My adaptation of a floor duct of simple structure to the housing of a plurality of circuits is such that satisfactory housing of the circuits is obtained, without sacrifice of the other qualities going to make a duct wholly satisfactory for that purpose.

In the accompanying drawings, Fig. I is an isometric view of one simple form of floor duct, made in accordance with my invention.

Fig. II is a bottom plan view of the floor duct shown in Fig. I.

Fig. III is a bottom plan view of a floor duct made in general conformity to the duct shown in Figs. I and II, but modified in the means used interiorly of the duct to integrate the duct elements.

Fig. IV is a cross-sectional view, through the floor duct, of Fig. III, taken in the plane of the section line IV—IV, Fig. III.

Fig. V is an exploded isometric view, showing an adaptation of a floor duct made in general conformity with the showing of Figs. I and II to the housing of the electrical wiring of a plurality of circuits.

Fig. VI is a cross-sectional view through a floor duct assembly as made from the structures shown in Fig. V.

Fig. VII is an isometric view of a duct similarly adapted, but formed and arranged in general conformity to the duct structure shown in Figs. III and IV.

Referring initially to Figs. I and II of the drawings, the main housing element of the duct is there designated by reference numeral 1. This main housing element comprises a top wall 1a and side walls 1b, declining divergently from the plane of the top wall 1a through equal distances, and at equal angles of declination, in installation to space the top wall 1a in substantial parallelism with the surface of a floor upon which the edges 1c of the side walls rest. Because of its general contour, the exterior housing 1 thus presents a ramp-like exterior conformation longitudinally along both its sides, and is thus adapted to lie in exposed position on a floor, or under a floor covering, with minimized obstruction presented above the floor surface. The edges 1c of the housing side walls are, as shown, sharp, so that they present to the floor surface a line or knife contact, which tends to cause the housing to lie straight and dead along the floor, and tends to cut into slight surface irregularities in the floor level. In this connection it should be noted that the presentation of basal surfaces of any substantial width to the floor by the duct housing tends to produce springiness in the duct as mounted, thus substantially detracting from the desirability of the duct.

The raceway 2 of the duct is formed interiorly of the housing body. This raceway is composed partially of a member 3 of inverted trough form in its mounted position. This trough-shaped member 3 is mounted by a welded integration, or other suitable attachment of its base 3a to the under surface of the central and top wall region 1a of the housing. Its side walls depend longitudinally in spaced relation from the inner surface of the top housing wall, and are curved outwardly at 3c adjacent their line of junction with the base of the element. A second trough element 4 is adapted for attachment to a floor surface, and to be embraced and engaged by the element 3, which is dependent from the interior face of the housing.

As shown in Fig. II of the drawings, the base of this channel element 4 is provided with a plurality of openings 5, for attachment of the channel to a floor or similar surface, by means of screws, nails, toggle bolts, or the like. The side walls of the channel element 4 curve outwardly along the lines of their junction with the base, and, reversing their curvature, are slightly convergent adjacent their upper edges.

In installation, channel element 4, which desirably possesses a resiliency greater than that of any element of the housing structure, is mounted on a floor, with its base in contact with the floor surface, to provide an open, elongate channel. In so mounting the channel member 4, it may be slightly deformed, partially to conform to irregularities in the floor surface. After installation of the conductors which are to be housed in the duct, the housing 1 is applied to the channel element 4, to form therewith a wholly enclosed and protected raceway.

In making this assembly the housing is brought into such relationship to the channel 4 that the interior surfaces of the sides 3b of the inverted trough 3, dependent in the housing, align with the sides of the channel in embracing relation thereto. By pressing the housing to the channel, a snap engagement is made between the duct elements with the housing engaged to the channel, and forming therewith the raceway 2, protected by the upper wall 1a and the ramp walls 1b of the housing. In this association the edges 1c of the housing or ramp walls tend to find a line contact flush with the floor, or biting slightly thereinto, in spite of slight irregularities in the floor surface and in the mounted position of the channel element on the floor surface.

Figs. III and IV of the drawings show a modification purposed specifically to decrease the over-all height of a floor duct, made in substantial conformity with the structure shown in Figs. I and II. In this modification the exterior contour of housing 6 may be identical with that of the housing 1, shown in preceding figures of the drawings. Interiorly of the housing, however, mounted connection with the channel element 7 of the assembly is provided by a plurality of clips 8, spot-welded or otherwise integrated with the interior surfaces of the ramp walls 6b of the housing body. These clips are so formed that they provide channel-engaging walls 8a, extending longitudinally adjacent the junction line between the ramp walls 6b of the housing and the top wall 6a of the housing. These clip walls 8a are crimped longitudinally at 8c, so that they present a longitudinally extended embracing curvature to the side walls 7b of the channel element 7.

In assembly with the base of channel element 7, resting upon a floor surface to provide the upwardly open channel element of a raceway, the housing 6 is positioned in the manner previously described, and is pressed downwardly upon the channel 7 in such manner that the housing clips embrace and engage the side walls of the channel. In this structure the raceway 9 has its base and side walls provided by the base and side walls of the channel. The edges of the channel walls, however, may lie directly against the under surface of the upper housing wall 6a, so that the cap or closure of the channel is represented by the single thickness of metal which forms the top wall of the housing. This modification presents advantage, in that, by reducing the over-all height of the duct as laid upon the surface of a floor, it decreases the obstruction above the floor level presented by the duct.

In Figs. V, VI, and VII of the drawings, I show the adaptation of my floor duct to housing the conducting wires of a plurality of electrical circuits, which circuits may possess diverse electrical characteristics. As shown in Figs. V and VI, housing 10 is identical with the housing 1 shown in Figs. I and II of the drawings, and has, dependent from the inner surface of its top wall, an inverted trough-shaped and longitudinally extended member 11, identical in form and arrangement with the member 3 of the duct form first described.

Channel element 12 is in itself identical with the channel element 4 shown in Figs. I and II of the drawings, and the channel element 7b in Figs. III and IV of the drawings. It has, however, integrated with its base, as manufactured or in assembly, as by spot welding or in other suitable manner, an auxiliary channel piece 13. This auxiliary channel piece 13 is extended laterally beyond the side walls of the channel element 12, its lateral projection, however, being within the boundary defined by the side or ramp walls of the housing. This piece 13 is deflected at 14, to provide longitudinally extended flange portions 15, extending upwardly and inwardly at an acute angle with the base 13a of the channel piece so that they overlie the base 13a of the channel piece throughout a substantial portion of their extent.

In installation of the structure, the channel assembly is mounted, base downwardly, upon the surface of a floor, and is fastened to it by means of screws, nails, or the like, passed through openings which extend both through the base of the channel element proper 12 and the base of the auxiliary channel piece 13. This provides three upwardly open raceways, namely, a central raceway 16, lying within the bounds of channel element 12, and auxiliary laterally positioned raceways 17 and 18, lying beyond the bounds of channel element 12, but between the outer surface of its side walls and the upstanding side walls of the channel piece 13. Into this multiple channel structure a lighting circuit, for example, may be inserted to lie in the central channel 16, a telephone circuit in the auxiliary channel 17, and a buzzer circuit in the auxiliary channel 18.

In enclosing the channel structure, to provide a complete duct, the side walls of the main channel element 12 are embraced by the dependent inverted trough member 11 in a manner identical to that previously described. At the laterally positioned auxiliary channels the inner surfaces of the ramp walls 10b contact the inwardly and upwardly inclined surfaces of the flanges 15 of auxiliary channel piece 13. A longitudinal zone in each of the auxiliary raceways is thus enclosed by the side walls 10b of the housing itself. Desirably, the auxiliary channel piece is so formed that its flanges 15 form with a plane surface, upon which the channel structure is mounted, an angle somewhat greater than that formed by the side or ramp walls of the housing. This slight difference in inclination causes the housing slightly to deflect the side walls of the auxiliary channel piece, thus insuring close engagement between the auxiliary channel piece and the side walls of the housing.

The structure shown in Fig. VII of the drawings is identical with that shown in Figs. V and VI, save that in it attachment of the housing 19 to the main channel element 20 is effected by means of clips 21, identical in form and arrangement with the clips 8 shown in Figs. III and IV of the drawings.

I claim as my invention:

1. A duct for electrical conducting wires adapted to rest upon the surface of a floor comprising a channel element formed as a base adapted for mounting on a floor surface and side walls upstanding from the base, a housing body having two divergently declining side walls arranged in assembly of the housing with the channel element to terminate laterally beyond the said channel and out of direct contact therewith, and clamping means dependent from the inner surface of the housing shaped in such dependent position to embrace the side walls of the channel and having resilient engagement therewith, said channel-clamping means being spaced from the terminal edges of the housing side walls; the relation of the elements being such that in mounted assembly of the elements the terminal edges of the housing side walls lie in contact with a floor surface to both sides of the channel element.

2. A floor duct in accordance with the combination of claim 1 comprising additionally an auxiliary channel element integrated with the base of the channel element proper and extended laterally to both sides thereof, said auxiliary channel element having a base and side walls formed and arranged wholly to lie within the cavity of the duct housing to provide within the boundary of the housing laterally positioned auxiliary ducts.

3. A duct for electrical conducting wires adapted to rest upon the surface of a floor comprising a channel element formed as a base adapted for mounting on a floor surface and side walls upstanding from the base, a housing body having two divergently declining side walls arranged in assembly of the housing with the channel element to terminate laterally beyond the said channel and out of direct contact therewith, and channel-engaging clips mounted in transverse opposition to each other to depend from the inner surface of the housing body, the said clips being so shaped and spaced from each other in their dependently mounted position as to embrace the side walls of the channel therebetween and having resilient engagement with the side walls of the channel, said channel-engaging clips being spaced from the terminal edges of the housing side walls; the relation of the elements being such that in mounted assembly of the elements the terminal edges of the housing side walls lie in contact with a floor surface to both sides of the channel element.

4. A floor duct in accordance with the combination of claim 3 comprising additionally an auxiliary channel element integrated with the base of the channel element proper and extended laterally to both sides thereof, said auxiliary channel element having a base and side walls formed and arranged wholly to lie within the cavity of the duct housing to provide within the boundary of the housing laterally positioned auxiliary ducts.

INSLEE A. BENNETT.